Figure 1:
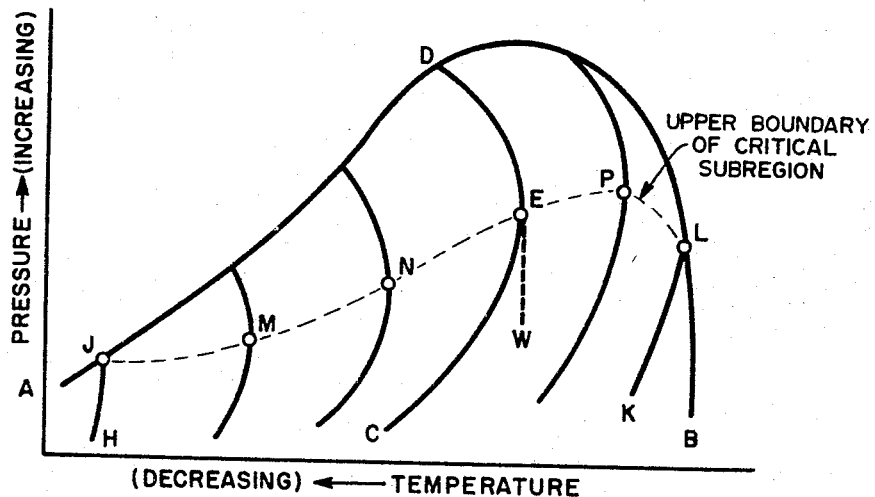
Figure 3:
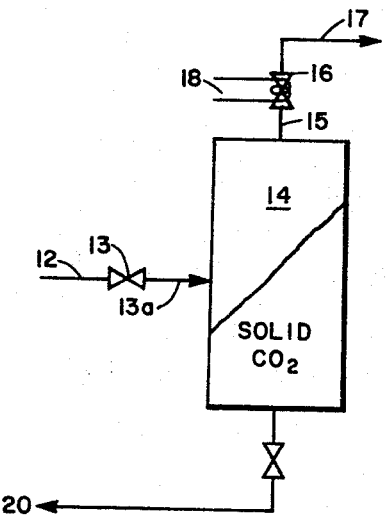
Figure 2:
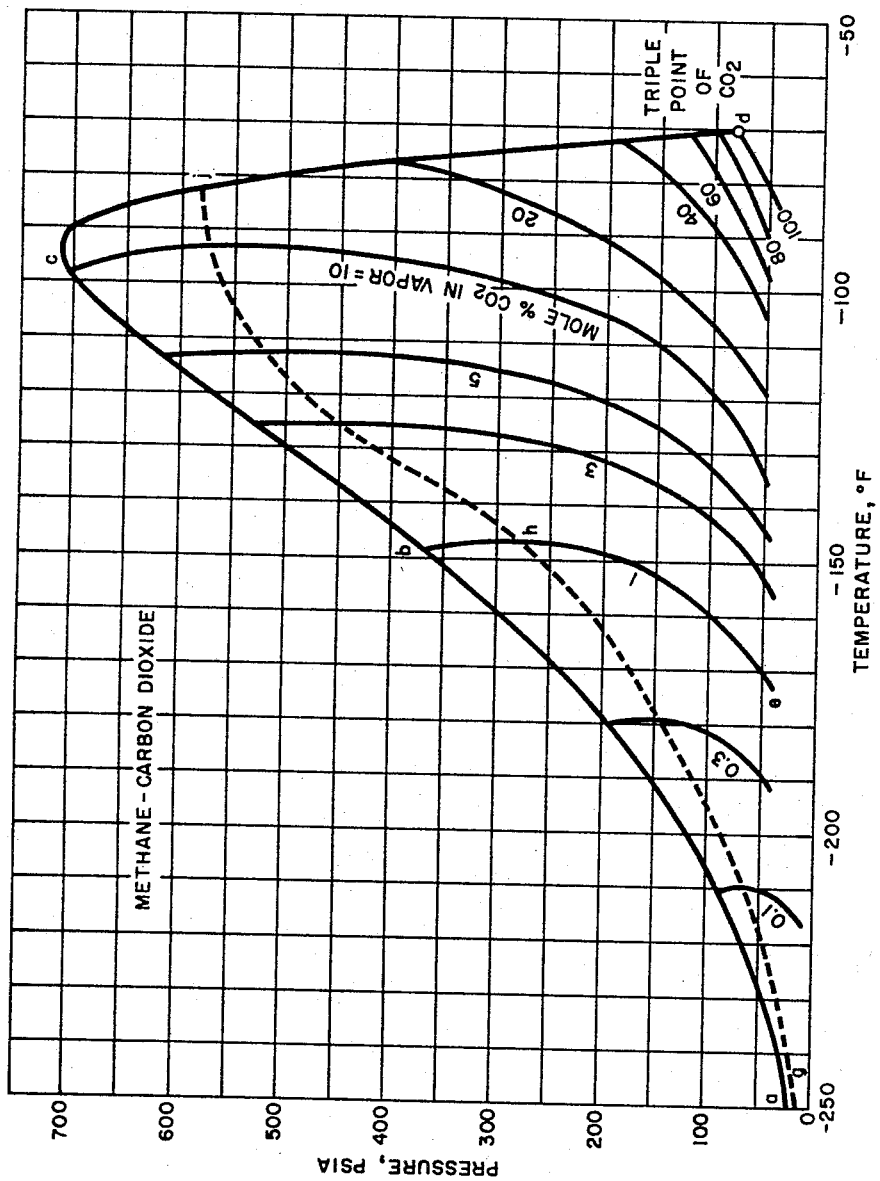

INVENTORS,
JOHN LOHRENZ
JOHN W. HASZ
JOHN N. DEW
BRUCE G. BRAY

BY

ATTORNEY

INVENTORS,
JOHN LOHRENZ
JOHN W. HASZ
JOHN N. DEW
BRUCE G. BRAY

ATTORNEY

United States Patent Office 3,324,668
Patented June 13, 1967

3,324,668
SEPARATION OF GASEOUS MATERIALS BY ISOTHERMAL EXPANSION IN A SUB-REGION OF A GAS-SOLID PHASE REGION
John Lohrenz, Tonkawa, and John W. Hasz, John N. Dew, and Bruce G. Bray, Ponca City, Okla., assignors to Continental Oil Company, Ponca City, Okla., a corporation of Delaware
Filed June 1, 1964, Ser. No. 371,348
5 Claims. (Cl. 62—12)

This invention relates to the separation of a gas mixture by low temperature processing where one component is separated as a solid phase.

It is advantageous to separate gas mixtures containing a solidifiable component by bringing the mixture to a temperature and pressure at which a solid phase and a gas phase is formed. The solid phase usually contains little or none of the other component(s) of the mixture. However, these processes have run into a major difficulty, namely, when the gas phase is withdrawn from the separation zone, additional solid is deposited in downstream valves and lines when friction and orifice effects cause a small pressure drop in the flowing stream of gas. It is difficult and costly to prevent clogging of lines and valves in these circumstances.

The principal object of this invention is a low temperature gas-solid separation process which avoids the deposition of solids subsequent to the gas-solid separation zone. Other objects will become apparent in the course of the detailed description of the invention.

FIGURE I shows an idealized gas-solid region of the phase diagram of a gaseous mixture suitable for processing in accordance with the invention.

FIGURE II shows the gas-solid region of the phase diagram of the carbon dioxide-methane gas mixture.

FIGURE III shows schematically the process of the invention as applied to a natural gas containing carbon dioxide impurity.

It has been discovered that deposition of additional solids can be avoided in the low temperature physical separation of one component from a mixture of gases, which mixture is characterized by a phase diagram having a gas-solid region, the solid being provided by the component desired to be separated, in which gas-solid region the temperature-pressure relationship, at a constant composition of gas phase, defines a line having a positive slope over at least a portion of its length, and also characterized by the existence of a sub-region within said gas-solid region within which sub-region the pressure-temperature line, at a constant composition of the gas phase, has only a positive slope, where the temperature and pressure of said gas mixture are controlled to bring said gas mixture within said gas-solid region and the gas phase is separated from the solid phase, by controlling the pressure and temperature of said gas mixture to bring said gas mixture within said gas-solid subregion; separating the gas phase from the solid phase; and withdrawing said gas phase in a substantially isothermal manner.

The general principle of determining the suitability of a gas mixture is as follows: Suitable mixtures consists predominately of two components and have a unique pressure-temperature relation (terminating at the triple points of the pure components) along which solid, liquid, and vapor phases are in coexistant equilibrium. At pressures below this unique pressure-temperature relation, vapor and solid phase exist in equilibrium. In this vapor-solid region of equilibrium, suitable mixtures have a locus of points of maximum solid formation. The vapor-solid separation process of the invention operates at pressures below this locus.

In other words: A gas mixture is a suitable feed to the process of the invention if it contains a component which can be solidified without solidifying the other component of the mixture, i.e., the phase diagram of the mixture contains a gas-solid region; and within the gas-solid region the pressure-temperature relationship; at a constant gas phase composition, defines a P–T line having a positive slope over at least a portion of the length of the line—it is understood that a family of such P–T lines exists within the gas-solid region. Normally, some of these P–T lines have a positive slope over their entire length.

Within the gas-solid region, a gaseous composition will not precipitate (deposit) additional solid when its pressure is decreased if its temperature is maintained substantially constant, and if the original pressure is less than maximum pressure on the positive slope portion of the pressure-temperature line for the gaseous composition.

FIGURE I shows an idealized gas-solid region of the phase diagram of a gaseous mixture suitable for processing in accordance with the invention. The region under line AJDLB represents the conditions of pressure and temperature where gas and solid phases occur in equilibrium, i.e., the gas-solid region. Line CED represents the relationship between pressure and temperature at a particular constant composition of gas phase. The gas phase contains more of the component, forming the solid phase, as the P–T lines approach the extreme right of the region.

Line CED has a portion CE which has a positive slope, i.e., the pressure increases as the temperature increases; and a portion ED which has a negative slope. Lines HJ and KL have a positive slope over their entire length. For each line having a positive sloped portion, and a negative sloped portion, such as CED, the higher pressure terminus, such as E, of the positive slope can be determined as shown by the circles M, N, E and P in FIG. I. The locus of circles J, M, N, E, P and L establishes the maximum pressure at which the particular gas mixture may be processed in accordance with the invention; the region under this locus J–L is the gas-solid subregion referred to herein.

It can be seen from FIG. I that a gas phase of given composition, existing within the P–T range of the gas-solid subregion, can be lowered in pressure without depositing additional solid phase when the gas phase is maintained at substantially constant temperature during the depressuring operation, e.g., depressuring along isothermal line EW.

Any gas mixture which meets the above requirements may be charged to the process of the invention. However, the process is particularly attractive for natural gas purification where a compound such as carbon dioxide or hydrogen sulfide must be removed. In order to meet specifications, the gas product of the process may have to be given a conventional chemical or adsorption treatment to clean up residual carbon dioxide or hydrogen sulfide. Illustrative suitable gas mixtures are: carbon dioxide and normally gaseous hydrocarbons such as; methane, ethane and ethylene, i.e., a natural gas; hydrogen sulfide and normally gaseous hydrocarbons; nitrogen and helium; carbon dioxide and nitrogen; methane and nitrogen; carbon monoxide and hydrogen; methane and hydrogen; nitrogen and hydrogen.

ILLUSTRATION

The invention is illustrated by the separation of carbon dioxide contaminant from a natural gas containing methane as essentially the only hydrocarbon present. FIGURE II shows the gas-solid region of the phase diagram of carbon dioxide-methane mixture; this diagram is substantially correct for a natural gas-$CO_2$ mixture and can be used to set operating conditions for the separation process. In FIG. II the gas-solid region lies under line $abcd$. Line $b$ represents the P–T relationship at a gas phase composition of 1% $CO_2$ and 99% methane. Line *ghj* establishes the maximum pressure usable in processing the natural gas feed according to the invention, i.e., the gas-solid subregion lies below line *ghj*.

FIGURE III shows schematically the separation of solid carbon dioxide from a natural gas. Here the gas contains 80 mole percent of methane and 20 mole percent of carbon dioxide. The gas from the well is brought to a temperature of −75° F. and a pressure of 980 p.s.i.a. This may be done by indirect cooling, expansion and compression—alone or in combination. The feed gas mixture is passed by way of line 12 into expansion valve 13 and the expanded gas stream is passed by way of line 13a into separation zone 14.

The conditions of expansion are controlled to produce a stream having a temperature of −146° F. and a pressure of 250 p.s.i.a. which brings the stream within subregion *ghj* of FIG. II. A gas phase and a solid phase are present in zone 14. The solid phase is essentially pure carbon dioxide; the gas phase contains 1% of $CO_2$ and 99% of $CH_4$.

Separation zone 14 may be a large chamber which permits gravity settling of the solid from the gas phase—as is shown in FIG. III. Provisions may be made to increase the efficiency of separation, e.g., a fibrous mat may be positioned near the top of chamber 14 or baffle plates may be positioned within chamber 14. In some circumstances a cyclone separation may be used. A combination of separating means may be used.

The gas phase is withdrawn continuously from zone 14 by way of line 15, valve 16 and line 17. In order to avoid deposition of solid in valve 16, the withdrawn gas is maintained at substantially the temperature of zone 14—herein −146° F. In this embodiment an electrical heater 18 is provided for valve 16. It can be seen from FIG. II that the curvature of the positive sloped P–T lines, e.g., portion *he*, permit depressing the gas phase, of a given composition, without maintaining exactly an isothermal condition and still avoid deposition of additional solids; in some instances a considerable temperature drop is tolerable; in other instances essentially isothermal withdrawal is necessary. In this embodiment, sufficient heat is introduced by way of heater 18 to keep the withdrawn gas at, within the error of measurement, the same temperature as zone 14.

It is self-evident that operation according to the invention eliminates solid deposition and consequent valve and line clogging in the critical parts of the equipment, namely, those located immediately adjacent the separation zone, and this is accomplished at trifling expense for the small amount of heating needed.

The solid $CO_2$ may be removed as such or as a liquid by way of valved line 20. When using separation zone of the type of chamber 14, normally two or more will be operated in parallel. One zone will be emptied while the other(s) are filling. In a cyclone separation the gas phase and the solid phase will be removed continuously.

Thus having described the invention, what is claimed is:

1. In the low temperature physical separation of one component from a mixture of gases, which mixture is characterized by a phase diagram having a gas-solid region, the solid being provided by the component desired to be separated, in which gas-solid region the temperature-pressure relationship, at a constant composition of gas phase, defines a gas-solid line having a positive slope over at least a portion of its length and a negative slope over another portion above the positive slope, and also characterized by the existence of a subregion within said gas-solid region within which subregion said line, at the constant composition of the gas phase, has only the positive slope, where the temperature and pressure of said gas mixture are controlled to bring said gas mixture within said gas-solid region and the gas phase is separated from the solid phase, the said positive and negative slopes of the line being divided by a point the locus of which points defines the upper boundary of the subregion, the improvement which consists of:

depressurizing the gas mixture in the subregion isothermally;

separating a gas phase from a solid phase; and withdrawing said gas phase in a substantially isothermal manner, whereby deposition of additional solid phase is avoided.

2. A process in accordance with claim 1 where said gas mixture consists essentially of carbon dioxide and normally gaseous hydrocarbon and wherein said gas phase is encircled in said hydrocarbon and said solid phase is enriched in carbon dioxide.

3. A process in accordance with claim 1 where said gas mixture consists essentially of nitrogen and helium and wherein said gas phase is enriched in helium and said solid phase is enriched in nitrogen.

4. A process in accordance with claim 1 where said gas mixture consists essentially of hydrogen sulfide and normally gaseous hydrocarbon and wherein said gas phase is enriched in said hydrocarbon and said solid phase is enriched in said hydrogen sulfide.

5. A process for the physical separation of carbon dioxide from admixture with normally gaseous hydrocarbon, which process comprises:

isothermally depressurizing said carbon dioxide and hydrocarbon mixture within the gas-solid region of a temperature-pressure phase diagram of said gas mixture wherein the temperature-pressure relationship at a constant composition defines a gas-solid line having a positive slope over at least a portion of its length and a negative slope over another portion above the positive portion and specifically within the subregion of said gas-solid region wherein said gas-solid lines, at constant gas phase composition, have only the positive slope said subregion being bounded above by the locus of points on the composition lines located at the point thereon at the upper end of the positive slope;

separating a solid carbon dioxide phase from a gas phase of lower carbon dioxide content than said gas mixture; and withdrawing said gas phase from the separation zone in a substantially isothermal manner, whereby deposition of additional solid phase is avoided.

References Cited

UNITED STATES PATENTS

| | | | |
|---|---|---|---|
| 2,011,551 | 8/1935 | Hasche | 62—10 |
| 2,900,797 | 8/1959 | Kurata et al. | 62—12 |
| 2,901,326 | 8/1959 | Kurata et al. | 62—12 |

NORMAN YUDKOFF, *Primary Examiner.*

V. W. PRETKA, *Assistant Examiner.*